United States Patent
Olariu et al.

(10) Patent No.: US 9,240,834 B2
(45) Date of Patent: Jan. 19, 2016

(54) METHOD AND APPARATUS FOR PROVIDING OPEN LOOP BANDWIDTH ALLOCATION

(75) Inventors: Gabriel L. Olariu, Germantown, MD (US); Shefali Jain, Germantown, MD (US); Roderick Ragland, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 1192 days.

(21) Appl. No.: 11/085,972

(22) Filed: Mar. 22, 2005

(65) Prior Publication Data

US 2006/0215628 A1    Sep. 28, 2006

(51) Int. Cl.
*H04B 7/185* (2006.01)
*H04W 28/20* (2009.01)
*H04W 72/04* (2009.01)

(52) U.S. Cl.
CPC .......... *H04B 7/18539* (2013.01); *H04W 28/20* (2013.01); *H04W 72/0413* (2013.01)

(58) Field of Classification Search
CPC .................................................. H04B 7/18539
USPC ........................................................ 370/322
See application file for complete search history.

(56) References Cited

U.S. PATENT DOCUMENTS

| | | | |
|---|---|---|---|
| 5,313,454 A * | 5/1994 | Bustini et al. ................. 370/231 |
| 5,384,777 A * | 1/1995 | Ahmadi et al. ............... 370/337 |
| 5,638,374 A * | 6/1997 | Heath ............................ 370/322 |
| 5,729,541 A * | 3/1998 | Hamalainen et al. ......... 370/337 |
| 6,366,761 B1 * | 4/2002 | Montpetit .................... 455/12.1 |
| 6,467,091 B1 * | 10/2002 | Lin et al. ........................ 725/126 |
| 6,522,638 B1 * | 2/2003 | Haugli et al. ................. 370/329 |
| 6,714,515 B1 * | 3/2004 | Marchand ...................... 370/231 |
| 6,738,350 B1 * | 5/2004 | Gao et al. ...................... 370/232 |
| 6,801,543 B1 * | 10/2004 | Ployer ............................ 370/468 |
| 6,845,104 B2 * | 1/2005 | Johnson et al. ................ 370/442 |
| 6,950,399 B1 * | 9/2005 | Bushmitch et al. ........... 370/236 |
| 6,982,969 B1 * | 1/2006 | Carneal et al. ................ 370/329 |
| 7,027,415 B1 * | 4/2006 | Dahlby et al. ................. 370/322 |
| 7,245,594 B1 * | 7/2007 | Esteves et al. ................ 370/322 |
| 7,260,069 B2 * | 8/2007 | Ram et al. ..................... 370/322 |
| 7,336,967 B2 * | 2/2008 | Kelly et al. ................... 370/468 |
| 7,403,538 B1 * | 7/2008 | Ho ................................ 370/443 |
| 7,565,152 B2 * | 7/2009 | Gandhi et al. ................. 455/453 |
| 7,570,952 B2 * | 8/2009 | Woxberg et al. .............. 455/450 |
| 7,639,989 B2 * | 12/2009 | Terry et al. .................. 455/67.11 |
| 7,664,068 B1 * | 2/2010 | Ho ................................ 370/328 |
| 2002/0167960 A1 * | 11/2002 | Garcia-Luna-Aceves .... 370/442 |
| 2003/0153320 A1 * | 8/2003 | Noerpel et al. ................ 455/450 |
| 2003/0176191 A1 * | 9/2003 | Cornett et al. ................. 455/445 |
| 2006/0019671 A1 * | 1/2006 | Chemiakina et al. ...... 455/452.2 |
| 2009/0247179 A1 * | 10/2009 | Bell et al. ................... 455/452.1 |

* cited by examiner

*Primary Examiner* — Timothy J Weidner
(74) *Attorney, Agent, or Firm* — K&L Gates LLP (57) ABSTRACT

An approach for allocating bandwidth is disclosed. A request is detected from a terminal for capacity on a communication channel based on type of traffic transmitted from the terminal. A bandwidth allocation pattern designated for the terminal is retrieved, wherein the bandwidth allocation pattern is set based on a predetermined service plan associated with the terminal. Bandwidth over the communication channel is reserved for the terminal according to the bandwidth allocation pattern without feedback to the terminal. This arrangement has particular applicability to a satellite network that provides data communication services.

20 Claims, 11 Drawing Sheets

METHOD AND APPARATUS FOR PROVIDING OPEN LOOP BANDWIDTH ALLOCATION

FIELD OF THE INVENTION

The present invention relates to communication systems, and more particularly to bandwidth allocation.

BACKGROUND OF THE INVENTION

Communication service providers, from cable to cellular to satellite providers, are ever mindful of the performance and availability of their networks. One key aspect for ensuring high performance and high availability concerns how traffic is engineered. This challenge is even greater when the network carries a diverse range of traffic type, from low data rate non-real-time traffic to high data rate real-time traffic. Additionally, subscribers require flexibility in terms of their commitment, or lack thereof, to a predetermined amount of capacity ahead of time. Such demand has resulted in the development of on-demand bandwidth allocation techniques, whereby a station or terminal can request capacity dynamically as their load requirements change. Traditionally, these bandwidth allocation techniques are closed loop, such that a feedback mechanism is established between a granting terminal and the requesting terminals to determine the amount of desired capacity. One drawback with this approach is that network capacity is consumed as overhead, largely because of this feedback or closed loop.

Based on the foregoing, there is a clear need for improved approaches for allocating bandwidth, while minimizing overhead.

SUMMARY OF THE INVENTION

These and other needs are addressed by the present invention, wherein an approach is provided for an open loop bandwidth allocation scheme.

According to one aspect of the present invention, a method for allocating bandwidth is disclosed. The method includes detecting a request from a terminal for capacity on a communication channel based on type of traffic transmitted from the terminal. The method also includes retrieving a bandwidth allocation pattern designated for the terminal, wherein the bandwidth allocation pattern is set based on a predetermined service plan associated with the terminal. Further, the method includes reserving bandwidth over the communication channel according to the bandwidth allocation pattern without feedback to the terminal.

According to another aspect of the present invention, an apparatus for allocating bandwidth is disclosed. The apparatus includes a processor configured to detect a request from a terminal for capacity on a communication channel based on type of traffic transmitted from the terminal. The apparatus also includes a memory coupled to the processor. The memory is configured to store a bandwidth allocation pattern designated for the terminal, wherein the bandwidth allocation pattern is set based on a predetermined service plan associated with the terminal, and the bandwidth over the communication channel is reserved according to the bandwidth allocation pattern without feedback to the terminal.

According to yet another aspect of the present invention, a method for supporting open loop bandwidth allocation is disclosed. The method includes identifying a type of traffic originating from a first terminal. The method also includes determining that the first terminal requires bandwidth allocation for interactive traffic based on the identified type of traffic. Additionally, the method includes allocating bandwidth over one or more communication channels to the first terminal according to a first bandwidth allocation pattern designated for the first terminal. The method also includes detecting a second terminal requiring bandwidth allocation for interactive traffic, wherein the second terminal has a second bandwidth allocation pattern designated for the second terminal. Further, the method includes allocating bandwidth over the one or more communication channels according to the second bandwidth allocation pattern, wherein the second bandwidth allocation pattern is selectively offset according to an aggregate bandwidth allocation pattern generated from the first bandwidth allocation pattern and the second bandwidth allocation pattern.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, apparatus, and software for providing open loop bandwidth allocation in a communication system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The present invention, according to one embodiment, provides an approach for an open loop bandwidth allocation mechanism. The bandwidth allocation mechanism detects the presence of a type of traffic, such as interactive traffic, and recognizes that allocations are to be made to reserve capacity for this type of traffic. A predetermined bandwidth allocation pattern is retrieved for the requesting terminal and applied. The bandwidth allocation pattern is predetermined based on a service plan corresponding to the terminal. In the case of a bandwidth request from another terminal, the allocation to this terminal is based on this terminal's predetermined bandwidth allocation pattern, which may be offset. That is, the starting point of the pattern is determined by generating an aggregate bandwidth allocation pattern from the collective predetermined bandwidth allocation patterns of the respective terminals. The above approach advantageously supports real-time bandwidth allocation for interactive traffic, while minimizing overhead cost.

Although the present invention is discussed with respect to a satellite communication system, it is recognized by one of ordinary skill in the art that the present invention has applicability to any type of transport network, such as an xDSL (Digital Subscriber Line) system or a cable network with a return channel.

Figure 1:
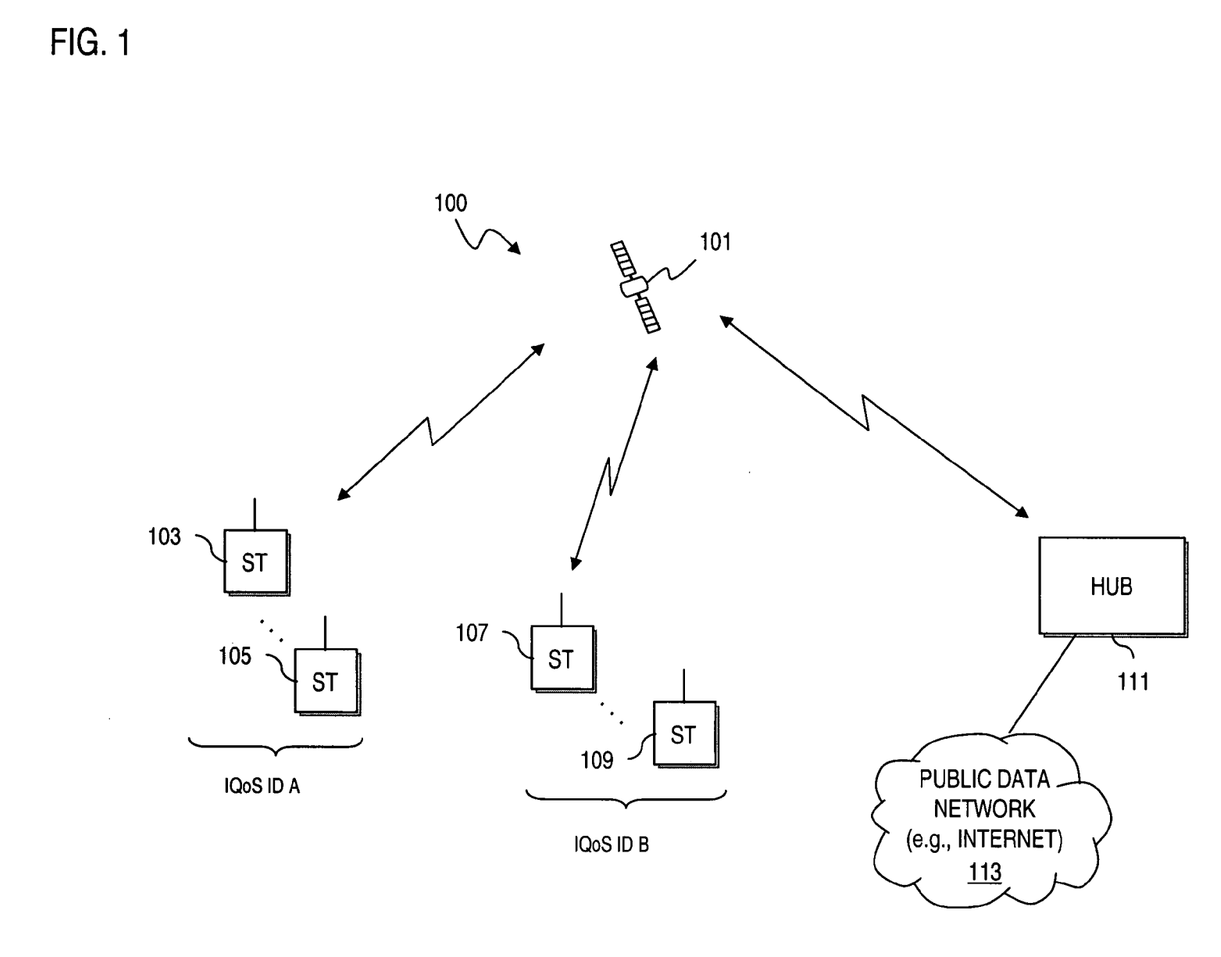
FIG. 1 is a diagram of a communication system capable of performing open loop bandwidth allocation, according to an embodiment of the present invention.

FIG. 1 is a diagram of a communication system capable of performing open loop bandwidth allocation, according to an embodiment of the present invention. A satellite communication system 100 utilizes a satellite 101 to transmit information, bi-directionally, to and from satellite terminals (STs) 103, 105, 107, 109 and a hub 111. In an exemplary embodiment, the STs 103, 105, 107, 109 are Very Small Aperture Terminals (VSAT), and can provide access to a public data network 113, such as the Internet. The hub 111 operates as part of a Network Operations Center (NOC). The NOC 111 manages and controls communication services and operations. For example, the NOC 111 provisions and identifies the communication channels that are to be allocated. Thus, the NOC 111 is responsible for controlling the bandwidth allocation that is made to the STs 103, 105, 107, 109.

A bandwidth allocation protocol is established between a remote terminal (e.g., STs 103, 105, 107, 109) and the hub 111 for the purpose of reserving bandwidth at a predefined and constant rate on one of the many available communication channels within the system 100. These types of assignments are referred to as "interactive bandwidth allocations." Interactive bandwidth can be characterized as bandwidth needed for bursty traffic, such as traffic can include traffic stemming from network performance measurement applications (e.g., PINGs), traffic from credit card transactions, Telnet type transactions, web page retrieval, acknowledging downloads, etc. In an exemplary embodiment, interactive bandwidth is allocated for short periods of time. By contrast, bulk bandwidth is typically required for file transfer where a large amount of data is transmitted over a longer period of time, whereby it is desirable to transmit the data as quickly as possibly.

According to one embodiment of the present invention, the remote terminal signals the need for interactive bandwidth to the hub 111 by using either a contention channel or some pre-allocated stream bandwidth over the system 100.

Figure 2:
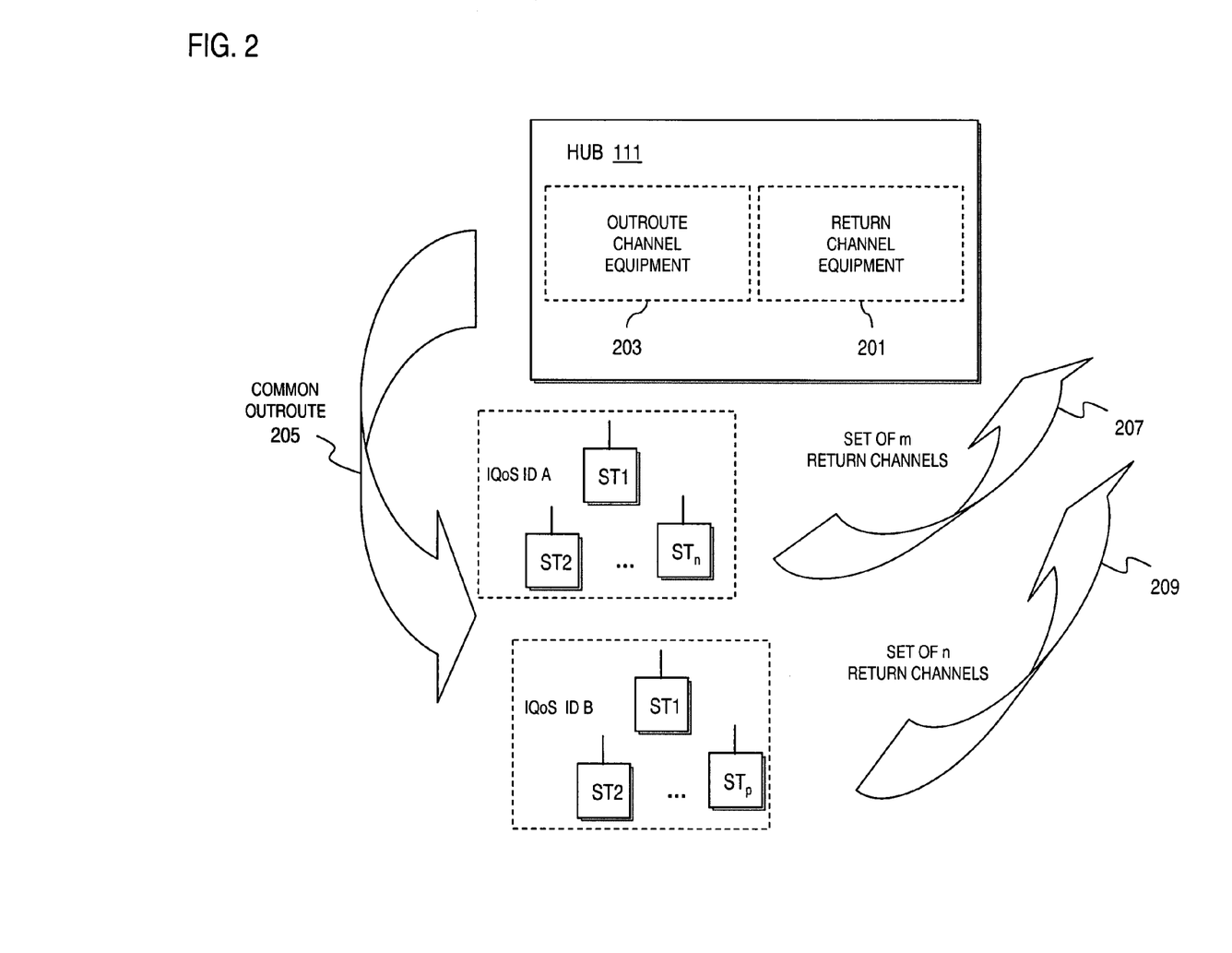
FIG. 2 is a diagram of an architecture of the hub in FIG. 1 for mapping return channel bandwidth to the terminals, according to an embodiment of the present invention.

The remote terminals, STs 103, 105, 107, 109, can be grouped according to a management criteria, wherein each group has access to a limited but configurable amount of interactive bandwidth. For example, the various STs 103, 105, 107, 109 can be associated with different subscribers. Notably, STs 103 and 105 are under control of Enterprise A, while STs 107 and 109 belong to Enterprise B. In the system 100, the STs 103, 105, 107, 109 originate traffic from a particular coverage area and may exchange data among themselves as well as other STs (not shown). According to one embodiment of the present invention, each subset of terminals 103, 105, 107, 109, is issued a unique Inroute Quality of Service Identifier (IQoS ID) as part of a service level agreement or service plan. Such an ID is configured in all the terminals that are commissioned, as well as in some of the equipment in the hub 111, e.g., return channel equipment (as shown in FIG. 2). Because each enterprise is likely to require the same quality of service level throughout the enterprise, the STs 103, 105 are assigned an IQoS ID A, and the STs 107, 109 are given an IQoS ID B.

Return channel bandwidth is dynamically mapped to customer terminals through, in an exemplary embodiment, messages sent from the hub 111 on the outroute. As used herein, "return channel", "inroute", and "uplink channel" are synonymously used to denote a communication channel established via the satellite 101 to transport data in the direction from the STs 103, 105 to the satellite 101 or the hub 111. The terms "receive channel", "outroute" and "downlink channel" refer to a communication channel carrying traffic in the direction from the satellite 101 or the hub 111 to the STs 103, 105.

The system 100 can support different traffic types and rates; e.g., constant bit rate traffic, periodic traffic, and interactive traffic. The return channel can include multiple carriers, each operating at speeds, for example, of 64 kbps, 128 kbps, or 256 kbps. In an exemplary embodiment of the present invention, each of these carriers is a TDMA (Time Division Multiple Access) stream, which employs several transmission schemes.

Bandwidth on any inroute group (set of inroutes) is available to any terminal that is able to use it. In other words, the STs 103, 105, 107, 109 are totally trusted. The hub 111 does not need to perform the admission control function, or have knowledge of permissible or authorized terminals, as the information, e.g., IQoS ID, is securely loaded into the terminals. This approach provides the advantage that the network of STs 103, 105, 107, 109 can be expanded without any change in the configuration of the return channel equipment within the hub 111.

As mentioned, each of the terminals 103, 105, 107, 109 can use a contention channel to request bandwidth from the NOC 111, and thereafter transmit data over a collision free (stream) channel. Interactive bandwidth can be allocated on any of the communication channels, and the STs 103, 105, 107, 109 can switch channels without affecting use of constant rate traffic that may be concurrently supported by the particular communication channels.

The system 100 supports the capability to set limits on the amount of interactive bandwidth that is allocated. Requests for interactive bandwidth received at the hub 111 after the configurable limit has been reached need not be fulfilled immediately. Such requests can be delayed, and eventually be serviced if the terminal is still active in the system 100 when resources have been freed up, and the need for interactive bandwidth still exists. This capability to set limit on the amount of interactive bandwidth allows a service provider to negotiate new agreements with customers who seek a larger limit on the amount of interactive traffic, thereby providing a new source of revenue.

The interactive bandwidth allocation protocol, according to one embodiment of the present invention, does not provide reservations for a terminal to specify the rate of interactive bandwidth. Instead, the rate is constant for all the terminals in a given group and can only vary across groups. For instance, the STs 103, 105 associated with IQoSID A would have an allocation at one rate, while the STs 107, 109 with IQoSID B can communicate at a different rate. Consequently, no particular site can monopolize the channel usage and the customer can readily plan the amount of bandwidth needed to service a known number of its terminals. In an exemplary embodiment, the hub 111 maintains traffic statistics and records to justify the allocation and use of return channel bandwidth.

At commissioning, the STs 103, 105, 107, 109 are configured with a set of parameters (which include the IQoS ID) required to access the resource. The hub 111 is responsible for allocating inroute bandwidth, and can do so without any knowledge of the identity of the users that are capable of using the system's resources. This capability enhances scalability in the system 100.

The requests for interactive bandwidth can arrive at any time: when the terminal goes active or later during an active session. According to one embodiment of the present invention, the interactive bandwidth protocol does not specify an acknowledgement policy, however, the decision to grant interactive bandwidth is in real-time and without delay. This ensures that the requests for interactive bandwidth are processed in the order they are received.

FIG. 2 is a diagram of an architecture of the hub of FIG. 1 for mapping return channel bandwidth to the satellite terminals, according to an embodiment of the present invention. As shown, the hub 111 of the system 100 includes return channel equipment 201 for interfacing with return channels, as well as outroute channel equipment 203 to transmit signals over an outroute 205 to the terminals associated with IQoS ID A and IQoS ID B. In this example, the outroute 205 is a common channel. By contrast, the terminals utilize different sets of return channels, according to the assigned IQoS ID. Specifically, Enterprise A with IQoS ID A employs a set of m return channels 207, and Enterprise B with IQoS ID B transmits over a set of n return channels 209.

In this example, Enterprise A has n terminals ($ST_1, \ldots, ST_n$), where each terminal is configured with IQoS ID A. Similarly, Enterprise B has p terminals ($ST_1, \ldots, ST_p$), each with identifier, IQoS ID B. The hub 11 associates the sets of return channels with the respective identifiers and advertises this mapping via the common outroute 205, using a dedicated outroute messaging protocol. Each set (group) of inroutes is uniquely identified within the system 100 through the identifier.

The system 100 can allow for continuous utilization of the network inroute resources (inroutes or return channels) by multiplexing users of different enterprises on the same set of return channels. That is, utilization of the return channels is enhanced by multiplexing traffic from terminals associated with different IQoS IDs upon a common set of return channels. This approach thus provides a higher return on investment for the service provider of the system 100 by associating multiple enterprises with the same set of inroutes. Each enterprise is guaranteed a minimum amount of return channel bandwidth and can use more if available (not used by the other parties).

For the purposes of explanation, it is assumed that enterprises 1 and k are sharing the same set of return channels (where k>1); i.e., that of group m. The mapping can be simply represented as a triplet (l, k, m). In an exemplary embodiment, the first two symbols in the triplet represent the start and end of a sorted range of IQoS IDs. Enterprises with IQoS IDs in this range have bandwidth dedicated on inroute group m. Under this scenario, the range is simple, containing only two IQoS IDs. Depending on the amount of bandwidth available on the inroute group and the customer requirements, this range can identify one or more enterprises. Maximum benefits in terms of inroute performance are achieved by identifying enterprises with diverse usage patterns and mapping them to the same set of inroutes.

An enterprise can add more sites and can use the service as soon as the newly installed terminals are correctly configured with the proper IQoS ID. This approach scales up easily because it does not involve any configuration change for the return channel equipment 201 (FIG. 2) of the hub 111.

Figure 3:
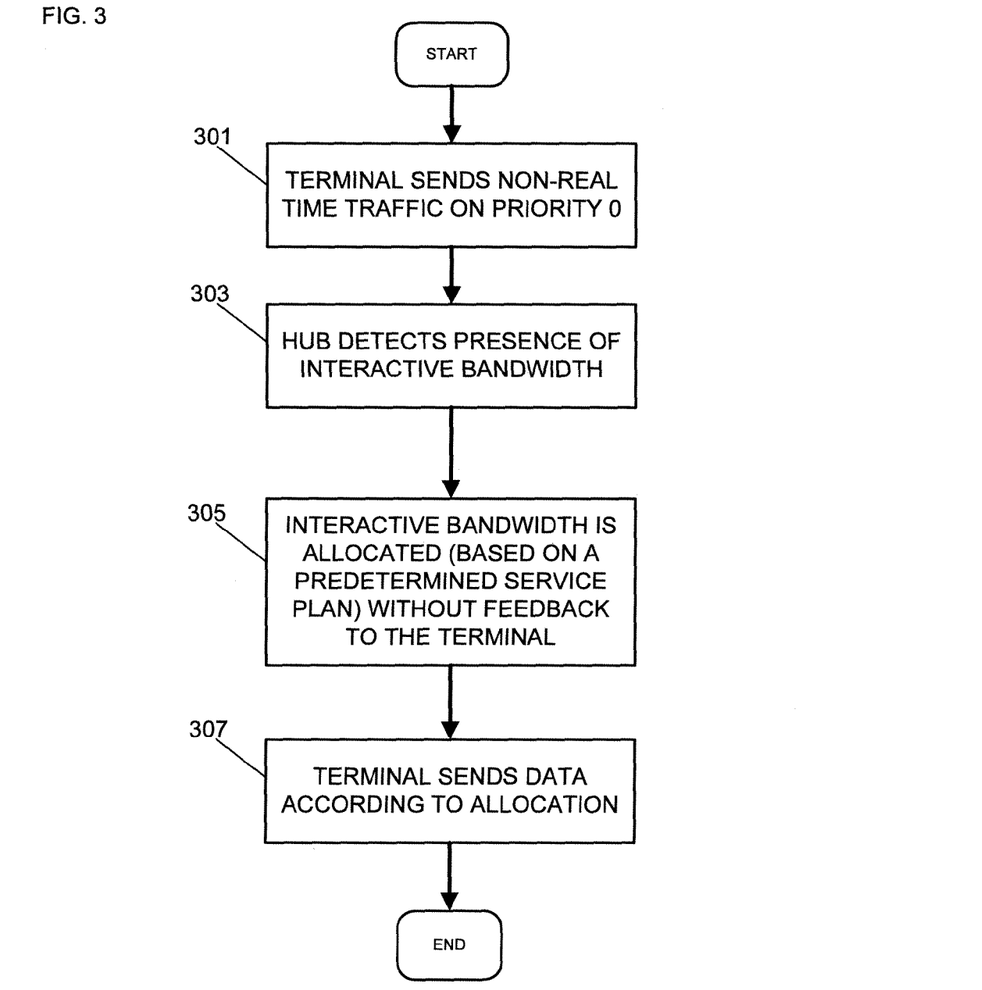
FIG. 3 is a flowchart of an open loop bandwidth allocation process, in accordance with an embodiment of the present invention.

FIG. 3 is a flowchart of an open loop bandwidth allocation process, in accordance with an embodiment of the present invention. As described above, the system 100 permits the allocation of inroute bandwidth to the STs 103, 105, 107, 109 that handle applications with relatively small amounts of data requiring quick reaction times in response to relatively small data requests. Such interactive traffic can include traffic stemming from network performance measurement applications (e.g., PINGs), traffic from credit card transactions, Telnet type transactions, web page retrieval, acknowledging downloads, etc.

Factors affecting the size and frequency of bandwidth allocations on an inroute are occupancy and traffic load. In general, remote terminals are allocated bandwidth to cover the advertised load (denoted as "backlog"), however the individual shares decrease in size and frequency when more and more users are assigned to the same inroute. Some amount of capacity, in the form of periodic bandwidth, are generally made available to all active terminals (e.g., STs 103, 105, 107, 109) on the inroute. The time distribution of the periodic assignments to any given terminal flattens out as the inroute congestion grows.

In a particular configuration, the system 100 can guarantee pre-negotiated levels of inroute bandwidth, but requires specialized equipment at the terminal and the hub. This inroute allocation model does not provide the adequate support for interactive applications.

Therefore, the system 100 ensures that a minimum amount of inroute bandwidth is allocated to a remote terminal for interactive bandwidth. The NOC 111 can execute the bandwidth allocation process in real-time, as now described. The parameters used in interactive bandwidth allocation can be defined in Inroute Quality of Service (IQOS) plans as follows:

[0044] IQoSk=g,TB,BP0,BP1,BP2,BP3,TS,H,Hi,AS,F1,F2, where g is an inroute group or set of communication channels; TB is the total bandwidth available for this set of remotes; BPi is bandwidth priority i=0, 1, 2, 3 that is available for this set of terminals; and TS is the time stamp. Also, AS represents the Allocation size, which is the amount of payload bytes to be allocated to eligible remote terminals for interactive bandwidth. The NOC 111 will add the protocol overhead and map the total amount to its equivalent in slots (denoted as $AS_{Tot}$). H is the holdover time in frames and can be customized on a per IQoS plan basis. The inroute group level value is used as default value in certain conditions. Hi is the holdover time in frames for maintaining the interactive allocations past the time when the last non-real-time packet was received on priority zero. F1 and F2 represent, respectively, the Active frames and the Total frames; collectively, these parameters define the frequency of allocation for interactive bandwidth. Using these notations, interactive bandwidth is allocated in the amount of $AS_{TOt}$ slots F1 out of F2 frames.

As seen in FIG. 3, the terminal becomes eligible for interactive bandwidth, for instance, from the moment the terminal sends (and the NOC 111 detects) non-real-time traffic on priority zero, per steps 301 and 303. This transmission can occur over an ALOHA contention channel or during use of allocated bandwidth. Thereafter, the interactive bandwidth is allocated (in this exact amount and at this same rate) for as long as the site operates outside the holdover time, whether or not it is used for delay sensitive applications. A smaller holdover time is suitable for enterprise inroute plans that are mainly transmitting interactive bandwidth. Large holdover times can result in wasted inroute bandwidth if little interactive bandwidth is needed.

In step 305, the hub 111 allocates the interactive bandwidth in response to the detected request from the terminal. According to one embodiment of the present invention, the allocation is up to the rate configured for priority 0 pool of bandwidth for the corresponding IQoS plan. This pool, for example, can be shared with a constant bit rate service at equal priority. The allocations need not be guaranteed for all the users of an IQOS plan. The requesting terminal subsequently sends interactive traffic according to the allocation, as in step 307. The interactive bandwidth allocation is terminated when the terminal goes inactive. Each IQoS plan can have a unique pattern for allocation of interactive bandwidth, as described with respect to FIG. 4.

Figure 4:
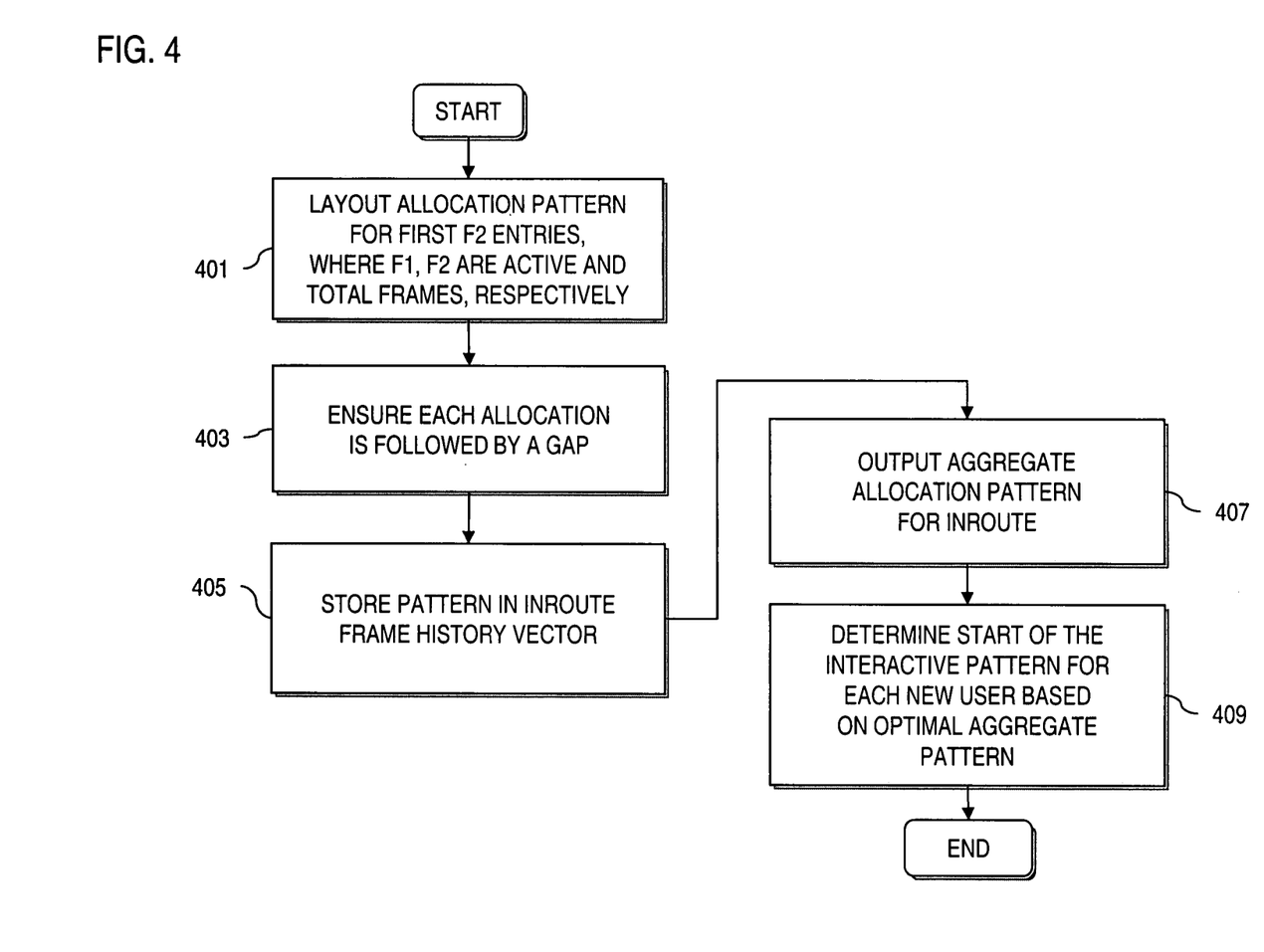
FIG. 4 is a flowchart of a process for determining and applying a bandwidth allocation pattern, in accordance with an embodiment of the present invention.
Figure 5:
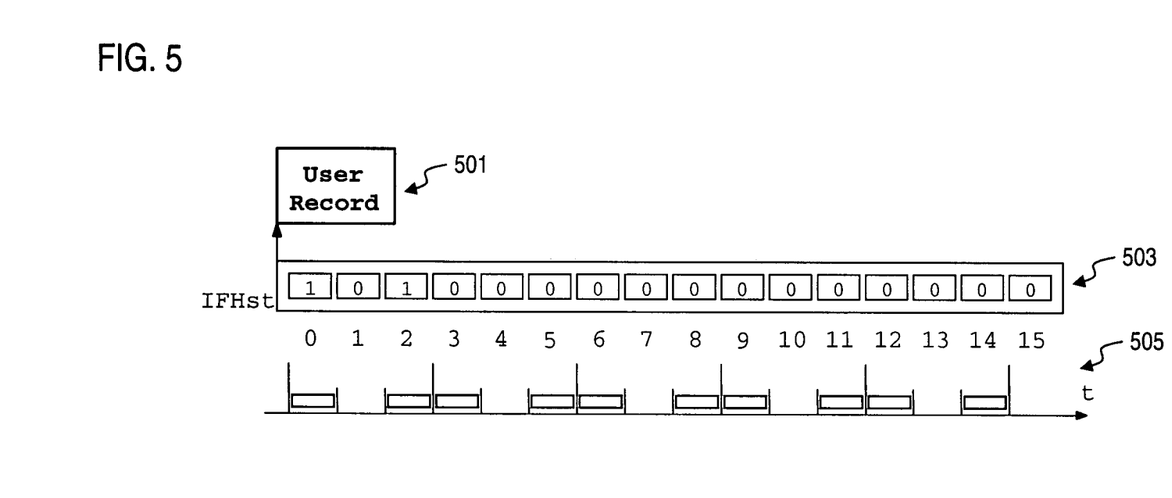
FIG. 5 is a diagram of an exemplary allocation pattern and a data structure for storing the allocation history, according to an embodiment of the present invention.

FIG. 4 is a flowchart of a process for determining and applying a bandwidth allocation pattern, in accordance with an embodiment of the present invention. The frames with interactive bandwidth are scheduled in advance and stored in a data structure, denoted the User Record 501, as shown in FIG. 5. The User Record 501 provides the hub 111 with an internal representation of the bandwidth allocation pattern associated with a particular terminal. The User Record 501 holds the short frames for interactive bandwidth.

For the purposes of explanation, the bandwidth allocation process used in the system 100 involves a TDMA streams. In a TDMA system, the time on any communication channel is divided into time frames and within each frame data slots are allocated for remotes to transmit data to the hub 111. A short frame is the remainder of the system frame and can be identified based on a user chosen number. According to an embodiment of the present invention, in the interest of conserving memory, the IQoS plans with allocation pattern lengths of over 4 frames (F2>4) are rejected during configuration.

During scheduling, the inroute bandwidth allocation process lays out the pattern for the first F2 entries in the Impute Frame History vector (IFHst) 503, per step 401. Each allocation is followed by a gap, as in step 403. Thus, a total of F2-F1 (F2>F1) gaps are found in any allocation pattern. In step 405, the interactive bandwidth allocation pattern is stored in the Inroute Frame History vector 503. The allocation pattern 505 (FIG. 5) corresponds to the entries of the vector 503. It is noted that the interactive bandwidth allocation is performed for those outroute frames (Form) for which UserRecord.IFHst[Form % F2] is nonzero.

At the inroute level, the IQoS interactive allocations combine into a general pattern with the following property: F 2 inroute=LCM i.function. (F 2 i), where i takes values in the set of IQoS IDs for the inroute group and LCM is the Least Common Multiplier.

Figure 6:
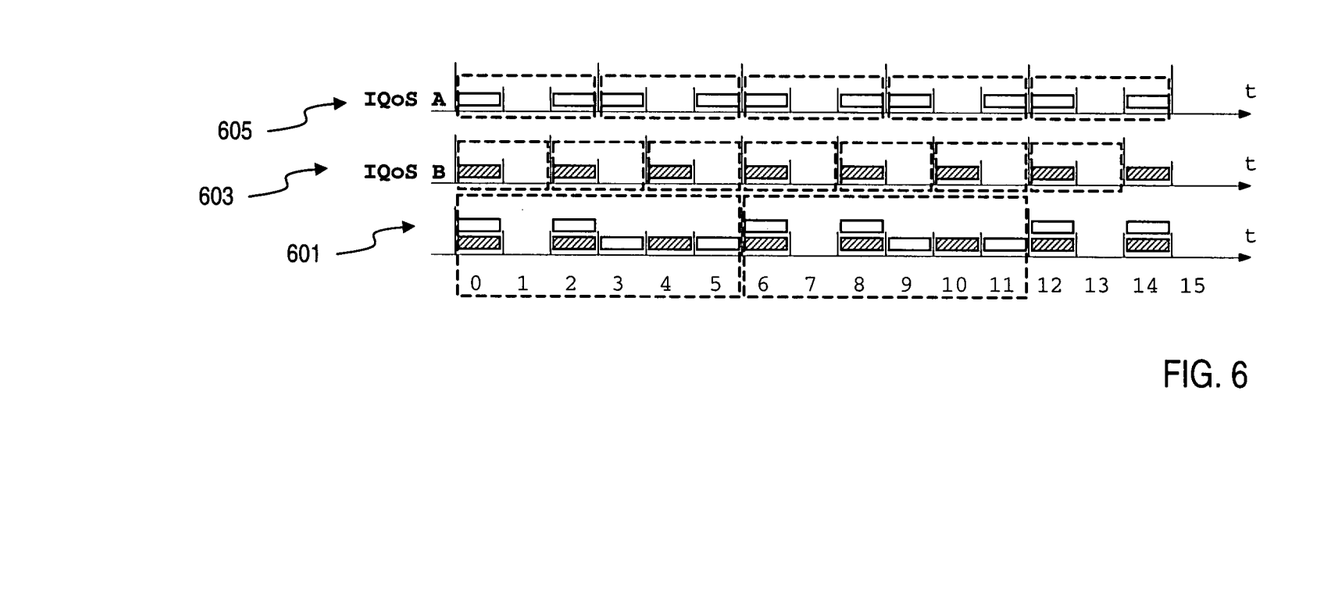
FIGS. 6 and 7 are diagrams of exemplary aggregate interactive allocation patterns.

In step 407, the aggregate allocation pattern for the inroute is generated. FIG. 6 illustrates the formation of the inroute interactive allocation pattern 601 (or aggregate allocation pattern) in the case of two users that are active on the same inroute and belong to two different IQoS plans. The IQoS plan A has a bandwidth allocation pattern 603, while the IQoS plan A is associated with a bandwidth allocation pattern 605.

Figure 7:
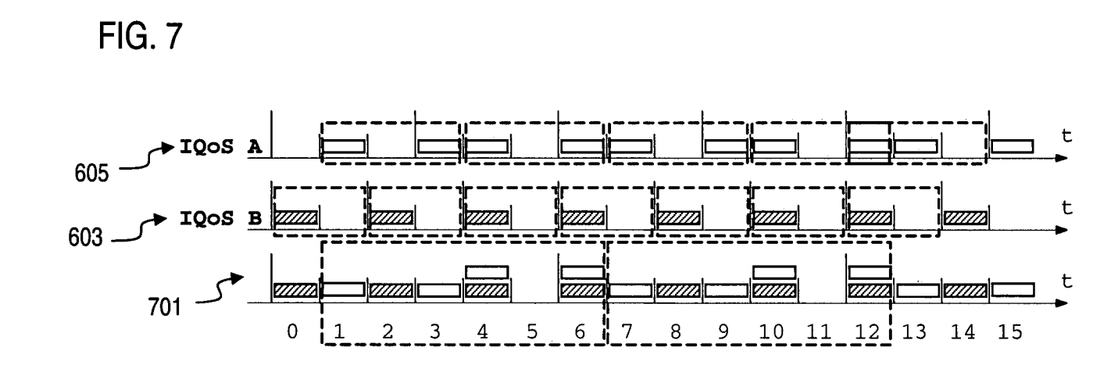
Figure 8:
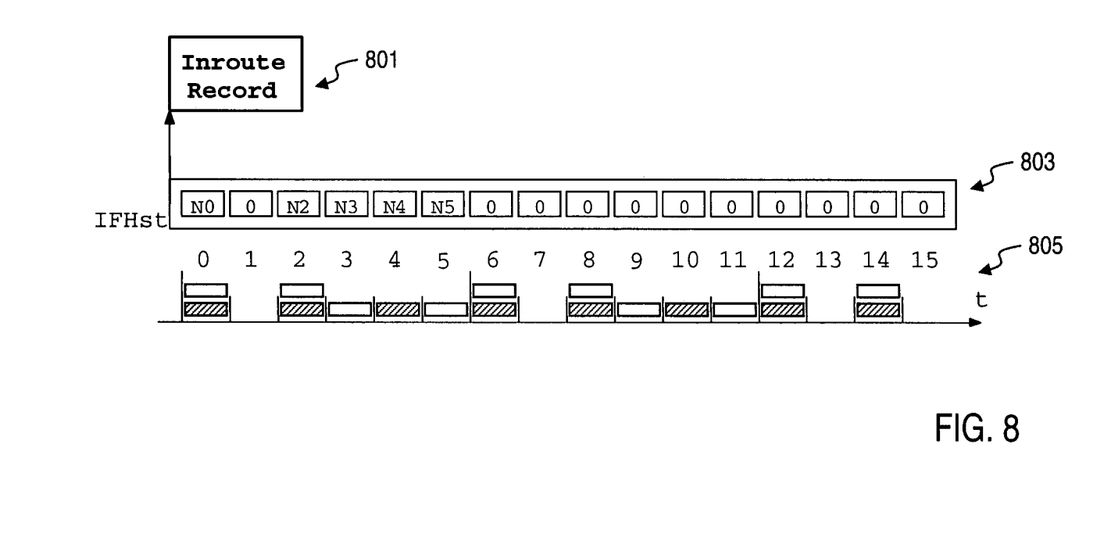
FIG. 8 is a diagram of the data structure for storing the allocation pattern of FIG. 6, according to an embodiment of the present invention.

FIG. 7 provides an alternative aggregate pattern for the scenario of FIG. 6. In this scenario, the pattern 603 is offset or shifted by one frame. The offset yields a different aggregate bandwidth allocation pattern 701. The supporting data structures as shown in FIG. 8 includes an Inroute Record 801 and an Inroute Frame History vector 803. The vector 803 stores the size of the interactive allocations ($N_i$) for each TDMA frame. Each entry in the inroute record vector represents the aggregate number of slots used on the inroute for interactive bandwidth ($N_i$). These numbers are used to determine the start of the interactive pattern for each new eligible user, as shown in FIG. 7. The IFHst vector 803 reflects the aggregate pattern 805.

Return to the example of FIG. 6, the two terminals, ST 103 and ST 107, have two different IQoS plans A and B. Under this scenario, it is assumed that the IQoS B terminal, ST 107, was already receiving interactive bandwidth at the moment when the IQoS A terminal, ST 103, becomes eligible. For any IQoS plan, the start of the interactive pattern for any user occurs during the frame that is an integer multiple of the start frame for the previous user plus one. It is noted that the ST 103 can start the allocation pattern on either an odd or an even frame. By way of example, to make an optimal determination for the starting point, the following is considered:
InrouteRecord.IFHst[even_frame]>InrouteRecord.IFHst [odd_frame].
Comparing the aggregate patterns of FIGS. 6 and 7, it is seen that the aggregate pattern 701 of FIG. 7 is more uniformly distributed than the pattern 601; this pattern 701 corresponds to starting at an odd frame. Thus, the pattern for the IQoS A user is best positioned if the terminal 103 starts transmission during an odd frame.

The interactive bandwidth allocation process of FIG. 4 suggests that the optimum allocation can be determined in real-time and in an open loop environment—i.e., no feedback loop is needed.

Figure 9:
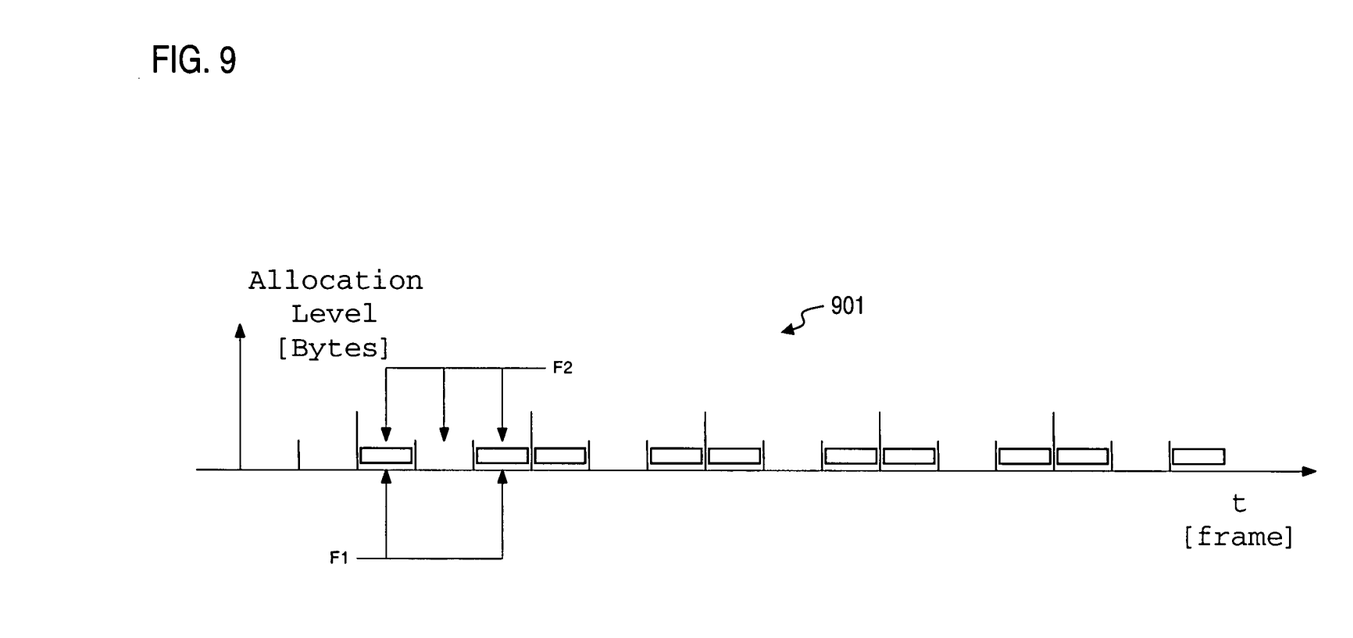
FIG. 9 is a diagram showing an interactive allocation to a first user, according to an embodiment of the present invention.

To further appreciate the above approach for interactive bandwidth allocation, it is instructive to describe other exemplary bandwidth allocations. By way of example, the following IQoS plan, IQoS1, is assumed:
IQoS1=3,254,127,10,100,17,2004:05:03:11:00:49,44,48, 1,2
This plan, for example, involves 128 kbps sequential inroutes, wherein a first user requires interactive bandwidth as follows: 48 Bytes at 1:2 frames overhead excluded; 64 Bytes at 1:2 frames overhead included; and 32 Bytes at 1:1 frames overhead included. The hub 111 determines that 714 Bytes at 1:1 frames is available, and grants an interactive bandwidth allocation pattern starting at frame F, (the repetitive pattern 901 is seen in FIG. 9).

Figure 10:
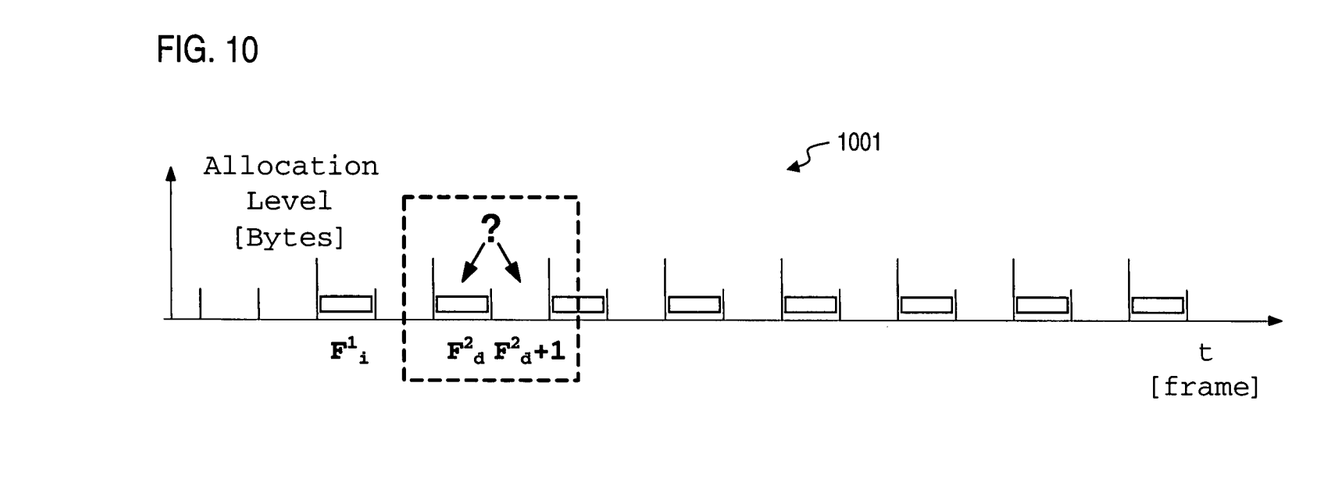
FIGS. 10-15 are diagrams of various allocation patterns, according to an embodiment of the present invention.
Figure 11:
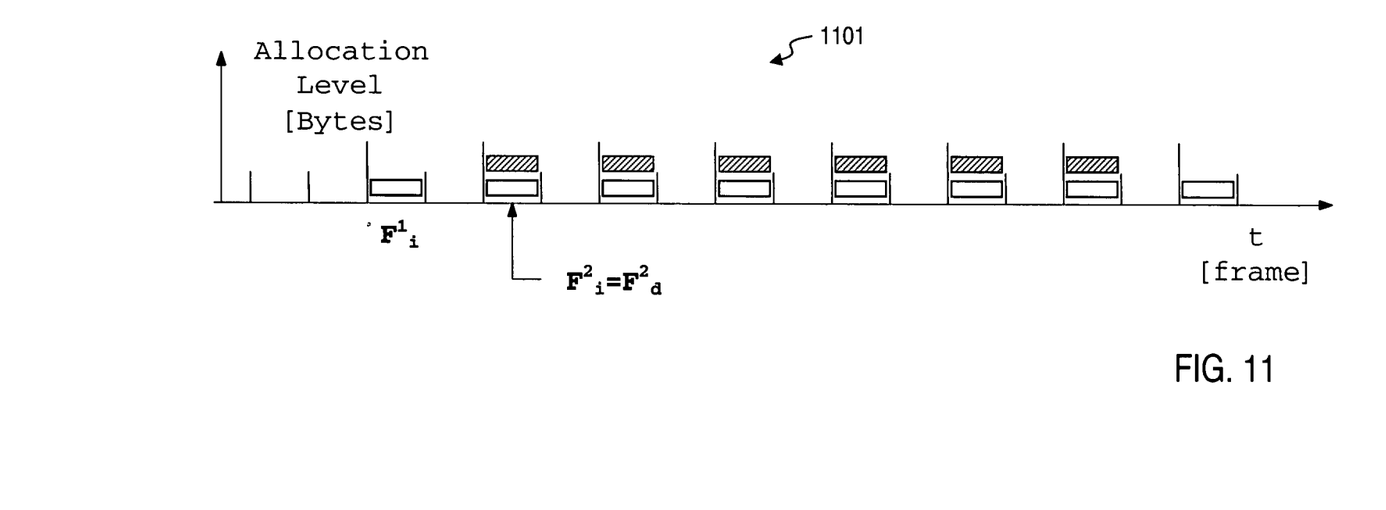
Figure 12:
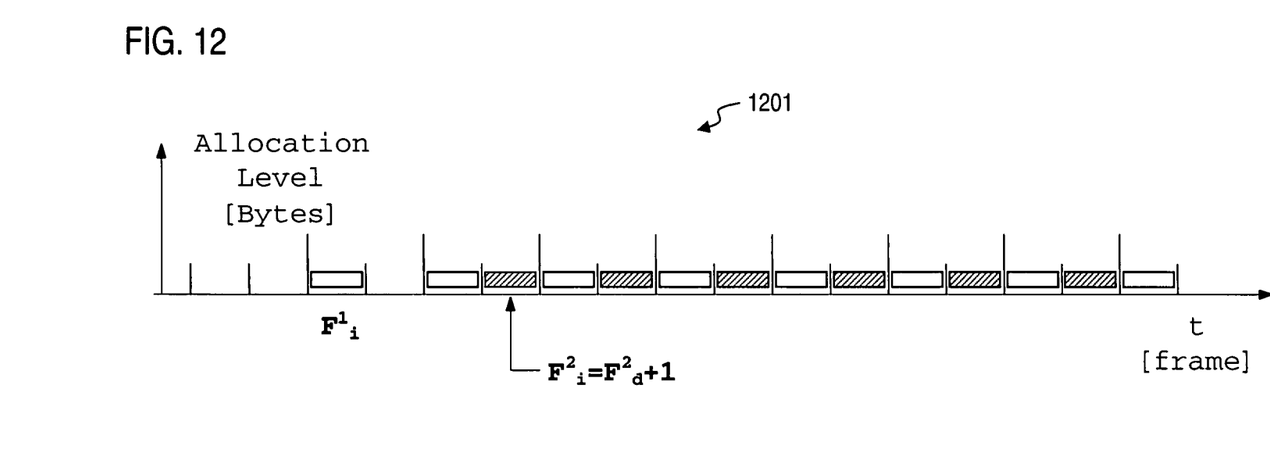

Next, a second user requires interactive bandwidth and is on the same inroute as the first user. This user has a designated bandwidth allocation pattern 1001 (FIG. 10). This second user needs the interactive bandwidth beginning at the frame $F^2_d$ However, the interactive bandwidth allocation scheme determines the start frame for the interactive pattern of the second user that will result in a better inroute utilization; namely whether starting the frame at frame $F^2_d+1$ would be more advantageous (shown in FIG. 10). A start at frame $F^2_d$, a poor time distribution of the interactive bandwidth on the inroute results (FIG. 11)—the aggregate bandwidth allocation pattern 1101 results. In the alternative, shown in FIG. 12, a start at frame $F^2_d+1$ results in a pattern 1201 that exhibits a uniform time distribution of the interactive bandwidth on the inroute. Consequently, the interactive bandwidth process elects the start frame of $F^2_d+1$.

Next, the interaction of users with different IQoS plans is examined. In this example, the following plans, IQoS 1 and IQoS2, exist, respectively, for the first user and the second user:

IQoS1=3,254,127,10,100,17,2004:02:29:00:00:00,110,44,48,1,2

IQoS2=3,381,64,73,100,144,2004:12:31:00:00:00,220,110,32,2,3.

Figure 13:
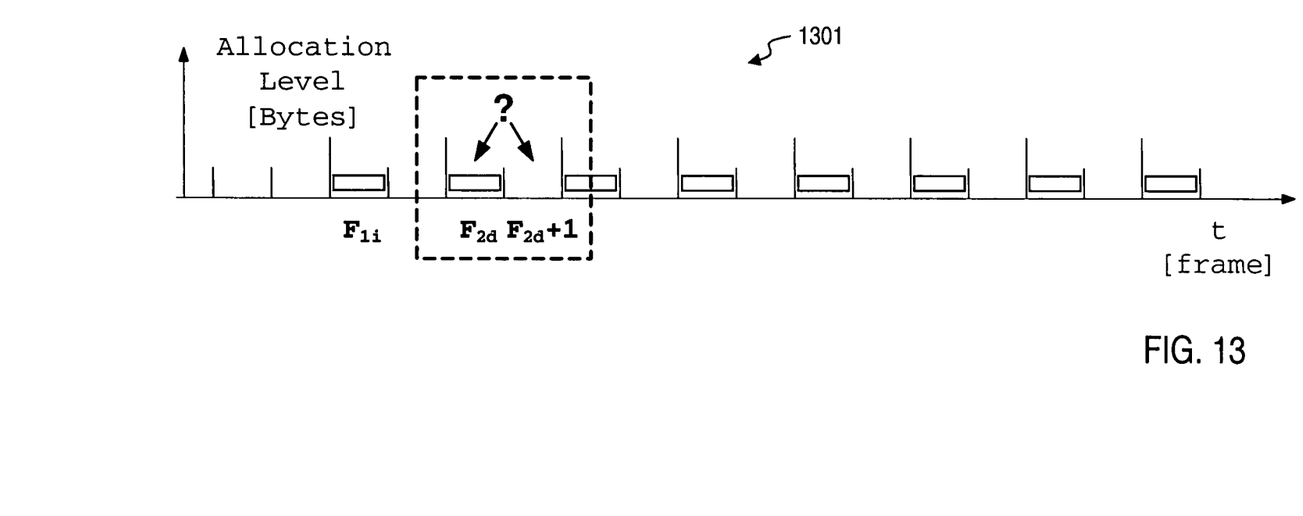
Figure 14:
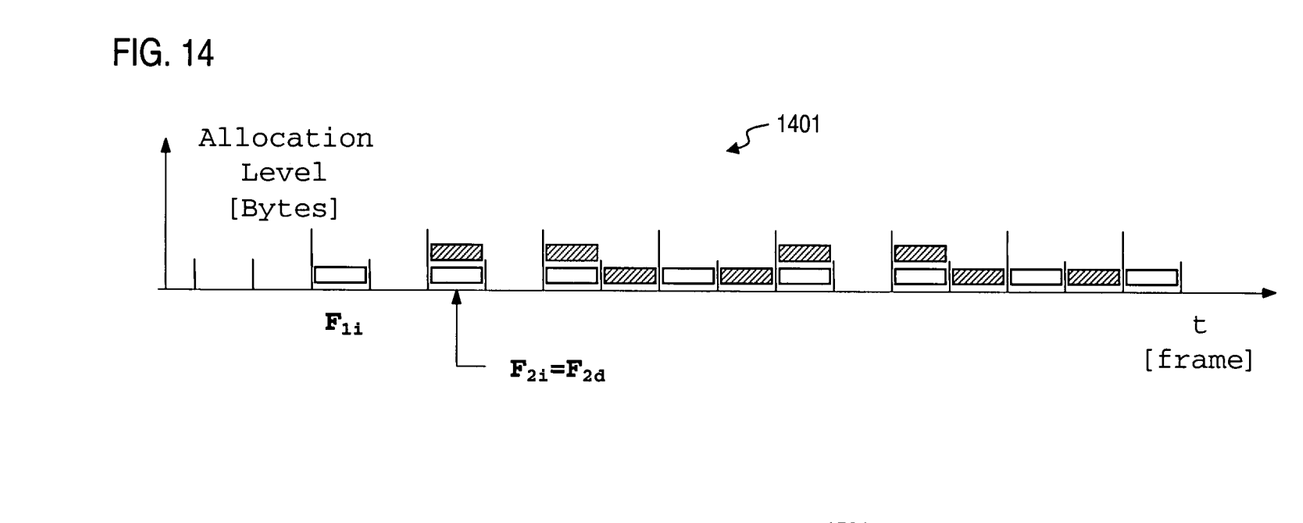
Figure 15:
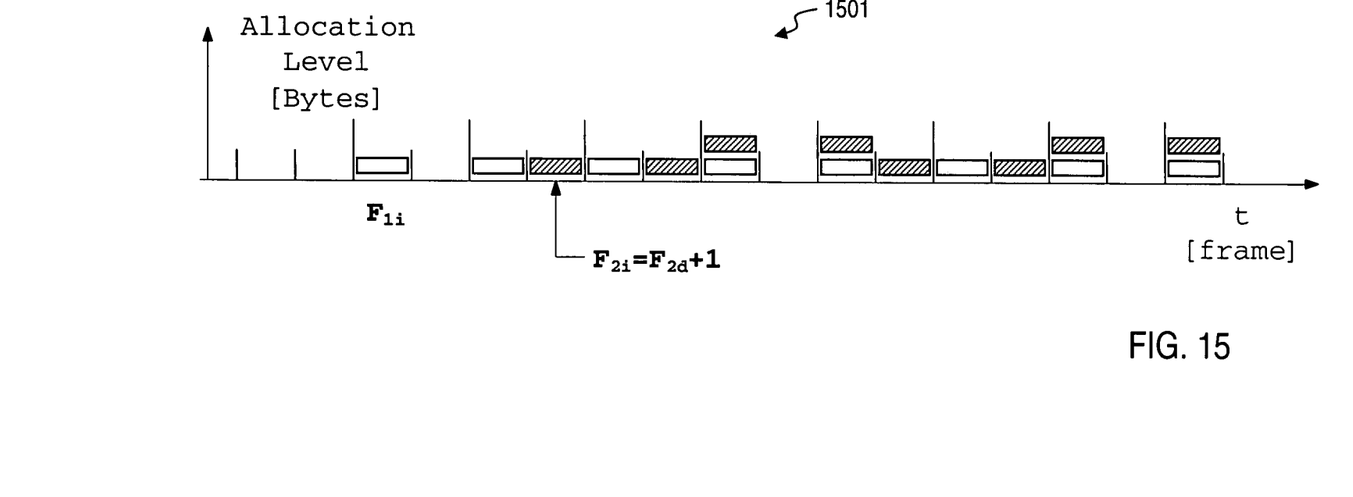

In FIG. 13, an allocation pattern 1301 for the IQoS1 plan for the first user is shown. The second user requires interactive bandwidth starting at $F_{2d}$ and has a designated bandwidth allocation pattern shown as hashed frames in the aggregate bandwidth allocation pattern 1401. The process needs to determined whether delaying the frame by 1, at $F_{2d}+1$ (FIG. 13), would result in a more uniform aggregate pattern. FIG. 14 shows a first aggregate pattern 1401, and a second aggregate pattern 1501 is illustrated in FIG. 15. Under this scenario, in either case of an odd or even starting frame, the aggregated pattern is periodic with period 6 and displays the same time distribution. In other words, the aggregate patterns are identical, whereby one does not offer any advantage over the other. As a result, starting at the earlier frame, $F_{2d}$, would be better in the sense that the particular terminal will be served sooner, and does not affect the utilization of the inroute.

The interactive bandwidth allocation process described above provides enhanced inroute utilization. This process, as detailed above in FIGS. 3 and 4, can be executed through a variety of hardware and/or software configurations.

Figure 16:
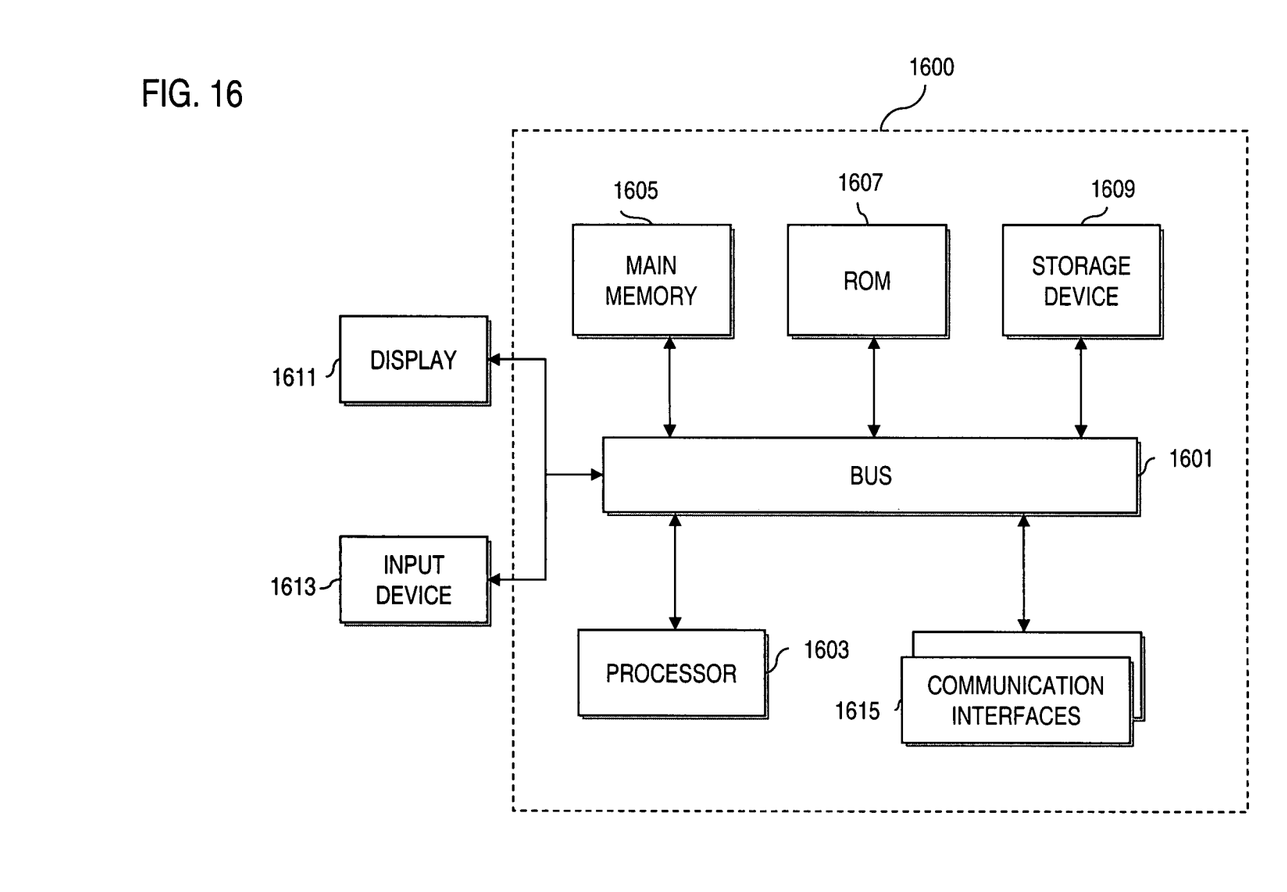
FIG. 16 is a diagram of hardware that can be used to implement an embodiment of the present invention.

FIG. 16 illustrates a computer system 1600 upon which an embodiment according to the present invention can be implemented. The computer system 1600 includes a bus 1601 or other communication mechanism for communicating information, and a processor 1603 coupled to the bus 1601 for processing information. The computer system 1600 also includes main memory 1605, such as a random access memory (RAM) or other dynamic storage device, coupled to the bus 1601 for storing information and instructions to be executed by the processor 1603. Main memory 1605 can also be used for storing temporary variables or other intermediate information during execution of instructions to be executed by the processor 1603. The computer system 1600 further includes a read only memory (ROM) 1607 or other static storage device coupled to the bus 1601 for storing static information and instructions for the processor 1603. A storage device 1609, such as a magnetic disk or optical disk, is additionally coupled to the bus 1601 for storing information and instructions.

The computer system 1600 may be coupled via the bus 1601 to a display 1611, such as a cathode ray tube (CRT), liquid crystal display, active matrix display, or plasma display, for displaying information to a computer user. An input device 1613, such as a keyboard including alphanumeric and other keys, is coupled to the bus 1601 for communicating information and command selections to the processor 1603. Another type of user input device is cursor control 1615, such as a mouse, a trackball, or cursor direction keys for communicating direction information and command selections to the processor 1603 and for controlling cursor movement on the display 1611.

According to one embodiment of the invention, the processes of FIGS. 3 and 4 are provided by the computer system 1600 in response to the processor 1603 executing an arrangement of instructions contained in main memory 1605. Such instructions can be read into main memory 1605 from another computer-readable medium, such as the storage device 1609. Execution of the arrangement of instructions contained in main memory 1605 causes the processor 1603 to perform the process steps described herein. One or more processors in a multi-processing arrangement may also be employed to execute the instructions contained in main memory 1605. In alternative embodiments, hard-wired circuitry may be used in place of or in combination with software instructions to implement the embodiment of the present invention. Thus, embodiments of the present invention are not limited to any specific combination of hardware circuitry and software.

The computer system 1600 also includes a communication interface 1615 coupled to bus 1601. The communication interface 1615 provides a two-way data communication coupling to a network link connected to a local network. For example, the communication interface 1615 may be a digital subscriber line (DSL) card or modem, an integrated services digital network (ISDN) card, a cable modem, or a telephone modem to provide a data communication connection to a corresponding type of telephone line. As another example, communication interface 1615 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1615 sends and receives electrical, electromagnetic, or optical signals that carry digital data streams representing various types of information. Further, the communication interface 1615 can include peripheral interface devices, such as a Universal Serial Bus (USB) interface, a PCMCIA (Personal Computer Memory Card International Association) interface, etc.

The network link typically provides data communication through one or more networks to other data devices. For example, the network link may provide a connection through local network to a host computer, which has connectivity to a network (e.g. a wide area network (WAN) or the global packet data communication network now commonly referred to as the "Internet") or to data equipment operated by service provider. The local network and network both use electrical, electromagnetic, or optical signals to convey information and instructions. The signals through the various networks and the signals on network link and through communication interface 1615, which communicate digital data with computer system 1600, are exemplary forms of carrier waves bearing the information and instructions.

The computer system 1600 can send messages and receive data, including program code, through the network(s), network link, and communication interface 1615. In the Internet example, a server (not shown) might transmit requested code belonging an application program for implementing an embodiment of the present invention through the network, local network and communication interface 1615. The processor 1603 may execute the transmitted code while being received and/or store the code in storage device 1609, or other non-volatile storage for later execution. In this manner, computer system 1600 may obtain application code in the form of a carrier wave.

The term "computer-readable medium" as used herein refers to any medium that participates in providing instructions to the processor 1603 for execution. Such a medium may take many forms, including but not limited to non-volatile media, volatile media, and transmission media. Non-volatile media include, for example, optical or magnetic disks, such as storage device 1609. Volatile media include dynamic memory, such as main memory 1605. Transmission media include coaxial cables, copper wire and fiber optics, including the wires that comprise bus 1601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the above approach provides an open loop bandwidth allocation mechanism that minimizes overhead cost.

While the present invention has been described in connection with a number of embodiments and implementations, the present invention is not so limited but covers various obvious modifications and equivalent arrangements, which fall within the purview of the appended claims.

What is claimed is:

1. A method comprising:
  detecting an advertised load from a terminal when the terminal becomes active, the advertised load being an initial advertised load of an active session, wherein the initial advertised load is a backlog of traffic;
  retrieving a bandwidth allocation pattern designated for the terminal, wherein the bandwidth allocation pattern is set based on a predetermined service plan associated with the terminal; and
  reserving bandwidth, over a communication return channel, for the terminal, which has an inroute quality of service identifier securely loaded onto the terminal such that the bandwidth is allocated without requiring knowledge of the identity of users that are capable of using the bandwidth, according to the bandwidth allocation pattern without feedback to the terminal in response to detecting the initial advertised load of the active session, wherein the bandwidth is reserved in an open loop environment which does not use feedback to reserve bandwidth during the active session.

2. A method according to claim 1, further comprising:
  detecting a second advertised load from a second terminal;
  retrieving a second bandwidth allocation pattern designated for the second terminal;
  selecting one of a plurality of aggregate bandwidth allocation patterns that are based on a first bandwidth allocation pattern and the second bandwidth allocation pattern; and
  reserving bandwidth, over the communication return channel, for the second terminal according to the second bandwidth allocation pattern having a starting point determined by the selected aggregate bandwidth allocation pattern.

3. A method according to claim 2, wherein the selecting step is based on uniformity of the selected aggregate bandwidth allocation pattern.

4. A method according to claim 2, wherein a traffic type is interactive traffic.

5. A method according to claim 2, wherein the terminals have similar quality of service level plans requiring transmission at a common data rate.

6. A method according to claim 2, wherein the second terminal has another predetermined service plan different from the predetermined service plan.

7. A method according to claim 1, wherein the communication return channel is established over a satellite.

8. A method according to claim 1, wherein the communication return channel is a Time Division Multiple Access (TDMA) stream.

9. A method according to claim 1, wherein the predetermined service plan specifies an allocation size that can be allocated to the terminal, and frame parameters indicating frequency of bandwidth allocation.

10. A non-transitory computer-readable storage medium having instructions executable by a processor to perform:
  detecting an advertised load from a terminal when the terminal becomes active, the advertised load being an initial advertised load of an active session, wherein the initial advertised load is a backlog of traffic;
  retrieving a bandwidth allocation pattern designated for the terminal, wherein the bandwidth allocation pattern is set based on a predetermined service plan associated with the terminal; and
  reserving bandwidth, over a communication return channel, for the terminal, which has an inroute quality of service identifier securely loaded onto the terminal such that the bandwidth is allocated without requiring knowledge of the identity of users that are capable of using the bandwidth, according to the bandwidth allocation pattern without feedback to the terminal in response to detecting the initial advertised load of the active session, wherein the bandwidth is reserved in an open loop environment which does not use feedback to reserve bandwidth during the active session.

11. An apparatus comprising:
  a processor configured to detect an advertised load from a terminal when the terminal becomes active, the advertised load being an initial advertised load of an active session, wherein the initial advertised load is a backlog of traffic; and
  a memory coupled to the processor, the memory configured to store a bandwidth allocation pattern designated for the terminal, wherein the bandwidth allocation pattern is set based on a predetermined service plan associated with the terminal, and the bandwidth, over a communication return channel, is reserved for the terminal, which has an inroute quality of service identifier securely loaded onto the terminal such that the bandwidth is allocated without requiring knowledge of the identity of users that are capable of using the bandwidth, according to the bandwidth allocation pattern without feedback to the terminal in response to detecting the initial advertised load of the active session, wherein the bandwidth is reserved in an open loop environment which does not use feedback to reserve bandwidth during the active session.

12. An apparatus according to claim 11, wherein the processor is further configured to execute the steps of:
   detecting a second advertised load from a second terminal;
   retrieving a second bandwidth allocation pattern designated for the second terminal;
   selecting one of a plurality of aggregate bandwidth allocation patterns that are based on a first bandwidth allocation pattern and the second bandwidth allocation pattern; and
   reserving bandwidth, over the communication return channel, for the second terminal according to the second bandwidth allocation pattern having a starting point determined by the selected aggregate bandwidth allocation pattern.

13. An apparatus according to claim 12, wherein the selecting step is based on uniformity of the selected aggregate bandwidth allocation pattern.

14. An apparatus according to claim 12, wherein a traffic type is interactive traffic.

15. An apparatus according to claim 12, wherein the terminals have similar quality of service level plans requiring transmission at a common data rate.

16. An apparatus according to claim 12, wherein the second terminal has another predetermined service plan different from the predetermined service plan.

17. An apparatus according to claim 11, wherein the communication return channel is established over a satellite.

18. An apparatus according to claim 11, wherein the communication return channel is a Time Division Multiple Access (TDMA) stream.

19. An apparatus according to claim 11, wherein the predetermined service plan specifies an allocation size that can be allocated to the terminal, and frame parameters indicating frequency of bandwidth allocation.

20. A method comprising:
   identifying an advertised load from a first terminal when the first terminal becomes active, the advertised load being an initial advertised load of an active session;
   determining that the first terminal requires bandwidth allocation for traffic based on the initial advertised load of the active session;
   allocating bandwidth, over one or more communication return channels, to the first terminal, which has an inroute quality of service identifier securely loaded onto the terminal such that the bandwidth is allocated without requiring knowledge of the identity of users that are capable of using the bandwidth, according to a first bandwidth allocation pattern designated for the first terminal without feedback to the first terminal based on the determination that the first terminal requires bandwidth allocation for interactive traffic, wherein the bandwidth is reserved in an open loop environment which does not use feedback to reserve bandwidth;
   detecting a second terminal requiring bandwidth allocation for interactive traffic, wherein the second terminal has a second bandwidth allocation pattern designated for the second terminal; and
   allocating bandwidth, over the one or more communication return channels, according to the second bandwidth allocation pattern, wherein the second bandwidth allocation pattern is selectively offset according to an aggregate bandwidth allocation pattern generated from the first bandwidth allocation pattern and the second bandwidth allocation pattern during the active session.

* * * * *